W. H. PALMER.
CULINARY IMPLEMENT.
APPLICATION FILED AUG. 4, 1919.

1,374,096.

Patented Apr. 5, 1921.

WITNESS:

William H. Palmer
INVENTOR.
BY
Victor J. Evans
ATTORNEY.

UNITED STATES PATENT OFFICE.

WILLIAM H. PALMER, OF YALE, MICHIGAN.

CULINARY IMPLEMENT.

1,374,096.  Specification of Letters Patent.  Patented Apr. 5, 1921.

Application filed August 4, 1919. Serial No. 315,192.

*To all whom it may concern:*

Be it known that I, WILLIAM H. PALMER, a citizen of the United States, residing at Yale, in the county of St. Clair and State of Michigan, have invented new and useful Improvements in Culinary Implements, of which the following is a specification.

This invention relates to culinary implements and the object of the invention is to provide an implement which may be used for a variety of purposes in the preparation of food stuffs in the kitchen, such as in mixing lard or butter into flour so as to render it unnecessary to mix these with the fingers. The device is also useful for washing greens and lifting them from the boiling water.

Another object of the invention is to make the device so that the material will not stick to it and one which may be easily cleansed.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
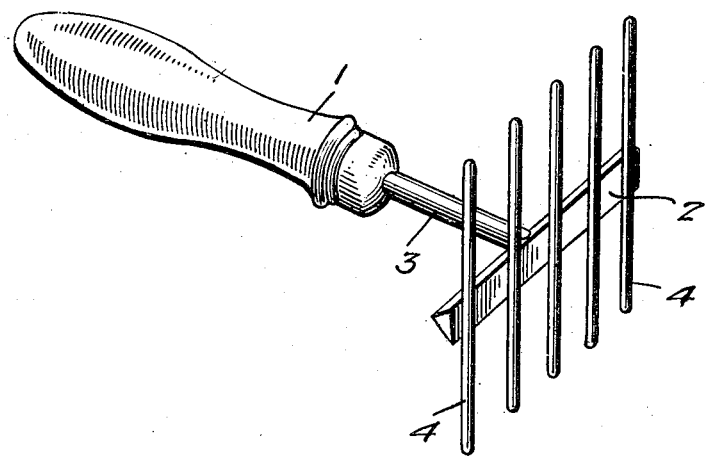
Figure 1 is a perspective view of the device.
Figure 2:
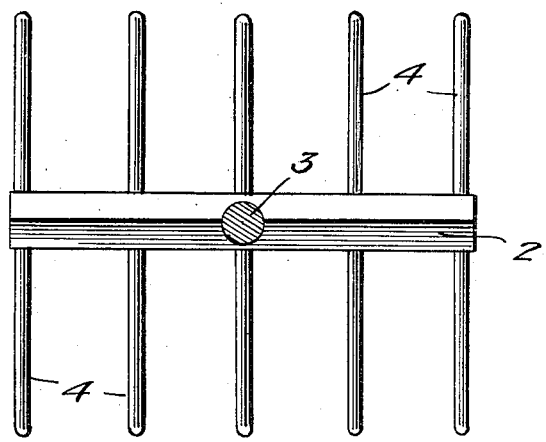
Fig. 2 is a cross section.

As shown in these views the device consists of a handle 1, the carrier bar 2 connected with the handle by the shank 3 and the fingers 4 carried by the bar. A flange 1' encircles the handle to prevent the hand of the user from slipping and to obtain a more secure grasp on the same. The carrier bar is of triangular shape in cross section with the fingers 4 connected to the base thereof midway of their ends so that the fingers are on each side of the bar. The shank 3 is connected with the apex of the bar. The fingers are shown as being of cylindrical form in cross section but if desired, I may make these fingers of triangular shape in cross section. The extremities of these fingers are slightly rounded as shown.

It will thus be seen that the fingers and their carrier bar will cut and mix the materials together so that lard or butter may be mixed with the flour without touching them with the hands. The material may be drawn to the center of the bowl or where desired by using one of the end fingers as a scraper. It will be seen that there are no ledges or flat places for the materials to lodge so that they will fall off the implement as soon as the same is lifted from the bowl. The formation of the implement also renders it useful for washing greens or lifting them from boiling water.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A culinary implement of the class described comprising a handle, a carrier bar triangular in cross section connected with said handle, a shank forming the connection between said handle and carrier bar, fingers being carried by said bar, said shank being connected with the apex of said bar, said fingers being circular in cross section and slightly rounded at their extremities, a flange encircling said handle at its lower end thereof.

In testimony whereof I affix my signature.

WILLIAM H. PALMER.